United States Patent
Kaybeleva

(10) Patent No.: US 12,345,534 B1
(45) Date of Patent: Jul. 1, 2025

(54) AUTOMATED TRAVEL PLANNING DATA PROCESSING SYSTEM, AUTOMATED TOUR GUIDE AND METHOD UTILIZING ADVANCED ARTIFICIAL INTELLIGENCE AND MACHINE LEARNING ALGORITHMS

(71) Applicant: Aliya Kaybeleva, Brooklyn, NY (US)

(72) Inventor: Aliya Kaybeleva, Brooklyn, NY (US)

(*) Notice: Subject to any disclaimer, the term of this patent is extended or adjusted under 35 U.S.C. 154(b) by 0 days.

(21) Appl. No.: 18/978,054

(22) Filed: Dec. 12, 2024

(51) Int. Cl.
*G01C 21/34* (2006.01)

(52) U.S. Cl.
CPC ....... *G01C 21/343* (2013.01); *G01C 21/3484* (2013.01)

(58) Field of Classification Search
CPC ...... G06Q 10/025; G06Q 50/14; G06F 16/02; G06F 16/29
See application file for complete search history.

(56) References Cited

U.S. PATENT DOCUMENTS

| | | | | |
|---|---|---|---|---|
| 2021/0303621 A1* | 9/2021 | Collins | ................ | G06F 16/787 |
| 2022/0316906 A1* | 10/2022 | Hoppenot | .......... | G01C 21/3682 |
| 2023/0195506 A1* | 6/2023 | Agam | .................... | G06F 9/526 |
| | | | | 718/101 |
| 2023/0306317 A1* | 9/2023 | Karri | ................. | G01C 21/3647 |

OTHER PUBLICATIONS

Ali Mansourian, ChatGeoAI: Enabling Geospatial Analysis for Public through Natural Language, with Large Language Models, Oct. 1, 2024, International journal of Geo-Information, (Year: 2024).*

* cited by examiner

*Primary Examiner* — Ismail A Manejwala
(74) *Attorney, Agent, or Firm* — Sam Pierce

(57) ABSTRACT

The present invention relates to an automated travel planning data processing system and method that leverages advanced artificial intelligence (AI) and machine learning (ML) algorithms to generate personalized travel itineraries in real-time. The system comprises a central server with one or more processors, memory, and a machine learning module, as well as a travel database that stores aggregated data from multiple sources. Users interact with the system through a natural language processing-based user interface, which receives inputs comprising travel dates, destinations, and preferences. An AI-powered itinerary generation engine processes user inputs and aggregated data to create personalized travel plans, utilizing a multithreading module for simultaneous data retrieval and processing. The machine learning module continuously optimizes the itinerary generation process by analyzing user preferences and travel data patterns. The invention also provides a method for automated travel itinerary planning using the data processing system.

1 Claim, 3 Drawing Sheets

AUTOMATED TRAVEL PLANNING DATA PROCESSING SYSTEM, AUTOMATED TOUR GUIDE AND METHOD UTILIZING ADVANCED ARTIFICIAL INTELLIGENCE AND MACHINE LEARNING ALGORITHMS

BACKGROUND

Field of Invention

The present invention relates generally to the field of travel planning and, more specifically, to an automated system and method for generating personalized travel itineraries using artificial intelligence (AI) and machine learning (ML) algorithms.

Description of Prior Art

Traditional travel planning involves a significant amount of manual effort and time to gather information from various sources. Users often need to search through multiple websites, guidebooks, and other resources to plan their trips, which can be a fragmented and time-consuming process. While there are existing travel planning tools available, they typically require users to manually input information and often lack integration with advanced AI algorithms. These tools do not offer real-time data aggregation or comprehensive itinerary planning.

In the related art, various systems and methods have been proposed to assist users with travel planning. For example, U.S. Pat. No. 7,925,540 B1 discloses a method and system for an automated trip planner that offers a travel itinerary to a user based on their profile. The system accesses data from preference and contextual content databases to offer travel times, ground transportation, and costs for multiple modes of transportation. However, this system does not leverage advanced AI and ML algorithms to automate the entire itinerary creation process in real-time.

Other related art systems, such as those described in U.S. Patent Application Publication Nos. 2002/0010604 A1 and 2003/0055689 A1, provide interactive travel planning and reservation systems that allow users to input their preferences and receive travel recommendations. However, these systems still require significant user input and do not offer the speed and efficiency of the present invention, which delivers a complete travel itinerary within one minute.

In summary, the existing systems and methods in the related art do not adequately address the need for an automated, efficient, and comprehensive travel planning solution that leverages advanced AI and ML algorithms to generate personalized itineraries in real-time. The present invention aims to fill this gap by providing a unique and innovative approach to travel planning that solves the problems associated with traditional methods and existing tools.

SUMMARY

This summary is provided to introduce a selection of concepts, in a simplified format, that are further described in the detailed description of the invention. This summary is neither intended to identify key or essential inventive concepts of the invention nor is it intended for determining the scope of the invention.

The present invention addresses the limitations of traditional travel planning methods and existing tools by providing an automated, efficient, and comprehensive travel planning data processing system that leverages advanced artificial intelligence (AI) and machine learning (ML) algorithms to generate personalized travel itineraries in real-time.

In one embodiment, the travel planning data processing system comprises a central server with a one or more processors, memory, and a machine learning module. The system also includes a travel database that stores aggregated data from multiple sources, such as images, descriptions, weather forecasts, travel tips, historical and geographical information. Users interact with the system through a natural language processing-based user interface, which receives inputs comprising travel dates, destinations, and preferences.

The core of the system is an AI-powered itinerary generation engine that processes user inputs and aggregated data to create personalized travel plans. The engine utilizes a multithreading module to enable simultaneous data retrieval and processing from various sources in real-time, ensuring the delivery of a comprehensive travel plan within one minute. The generated itinerary is presented to the user via a user interface, which allows for user interaction and customization.

The machine learning module continuously optimizes the itinerary generation process by analyzing user preferences and travel data patterns. It also learns from user feedback and preferences from previous travel plans to improve the quality and relevance of future itineraries.

In another embodiment, the invention provides a method for automated travel itinerary planning using the data processing system. The method involves receiving user inputs via the natural language processing-based user interface, accessing the travel database, deploying multiple virtual agents using the multithreading module to retrieve and process relevant travel data, analyzing the data using the AI-powered itinerary generation engine, compiling the analyzed data into a comprehensive itinerary, and presenting the itinerary to the user via the user interface.

The method further includes updating the travel database with real-time information and dynamically adjusting the generated itinerary based on the updated information. The AI-powered itinerary generation engine applies reinforcement learning algorithms to continually improve the quality and relevance of the generated itineraries based on user feedback and behavior.

The travel planning data processing system and method of the present invention offer significant advantages over traditional travel planning methods and existing tools. By leveraging advanced AI and ML algorithms, the system automates the entire itinerary creation process, saving users time and effort. The multithreading module ensures the delivery of comprehensive travel plans within one minute, while the machine learning module continuously optimizes the itineraries based on user preferences and feedback. The natural language processing-based user interface and application provide a seamless and interactive user experience, allowing for easy customization and collaboration.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

Additional features and advantages of the invention will be set forth in the description which follows, and in part will be obvious from the description, or may be learned by the practice of the invention. These and other features of the present invention will become more fully apparent from the following description, or may be learned by the practice of the invention as set forth hereinafter.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

Figure 1:
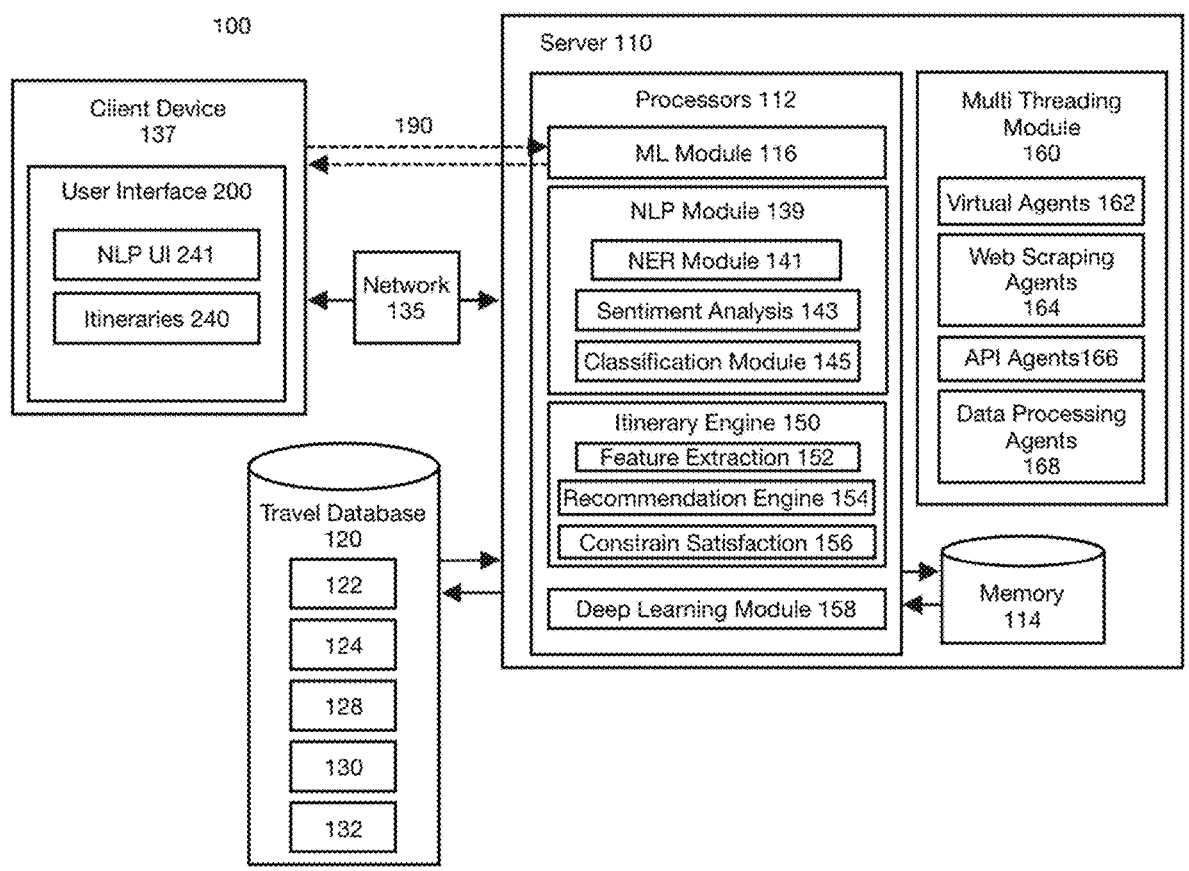
FIG. 1 illustrates a comprehensive system diagram of a travel planning data processing system, detailing all components and their interactions.

In the following detailed description of the preferred embodiments, reference is made to the accompanying drawings, which form a part hereof and show, by way of illustration, specific embodiments in which the invention may be practiced. It is to be understood that other embodiments may be used and structural or logical changes may be made without departing from the scope of the present invention. The following detailed description, therefore, is not to be taken in a limiting sense, and the scope of the present invention is defined by the appended claims.

The following description is provided as an enabling teaching of the present systems, and/or methods in its best, currently known aspect. To this end, those skilled in the relevant art will recognize and appreciate that many changes can be made to the various aspects of the present systems described herein, while still obtaining the beneficial results of the present disclosure. It will also be apparent that some of the desired benefits of the present disclosure can be obtained by selecting some of the features of the present disclosure without utilizing other features.

Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

The terms "a" and "an" and "the" and similar references used in the context of describing a particular embodiment of the present invention (especially in the context of certain claims) are construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein.

All systems described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application. Thus, for example, reference to "an element" can include two or more such elements unless the context indicates otherwise.

As used herein, the terms "optional" or "optionally" mean that the subsequently described event or circumstance can or cannot occur, and that the description includes instances where said event or circumstance occurs and instances where it does not.

The word or as used herein means any one member of a particular list and also includes any combination of members of that list. Further, one should note that conditional language, such as, among others, "can," "could," "might", or "may" unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

FIG. 1 illustrates a comprehensive system diagram of a travel planning data processing system 100, detailing all components and their interactions. As shown in FIG. 1, the system comprises a central server 110 equipped with one or more processors 112, a memory 114, and a machine learning module 116. In one embodiment, the central server 110 is connected to a travel database 120 that stores aggregated data from multiple sources, comprising images 122, descriptions 124, weather forecasts 126, travel tips 128, historical information 130, and geographical information 132. According to one embodiment, said aggregated data is collected from various sources, such as travel websites, social media platforms, and online review sites, using web scraping techniques and API integrations.

The server 110 is connected to the one or more client devices 137 via the network 135, which may be a local area network (LAN), wide area network (WAN), or the Internet. The server 110 also hosts web-based applications which facilitate user interfaces 200 on the client devices. These web-based applications may be developed using frameworks such as Angular, React, or Vue.js, and communicate with the one or more processors 112 using APIs and protocols such as HTTP, REST, or GraphQL. The server 110 handles user authentication and authorization, ensuring secure access to the system 100.

With reference to FIG. 1, the natural language processing (NLP) based user interface 241 is a critical component of the travel planning data processing system 100 and accessed through web-based applications using one or more client devices 137, such as smartphones, laptops, tablets, or desktop computers. The NLP based user interface 241 is powered by an NLP Module 139 hosted on the server 110. The NLP Module 139 leverages state-of-the-art NLP techniques, such as named entity recognition (NER) 141, sentiment analysis 143, and intent classification 145, to accurately interpret and extract relevant information from user inputs. Additionally the NER module 141 is configured to identify and categorize named entities, such as locations, dates, and events, while the sentiment analysis module 143 is configured to determine the user's preferences and attitudes towards various travel aspects. Optionally, the intent classification module 145 is configured to determine the user's primary goal or purpose for the trip, such as leisure, business, or adventure.

As depicted in FIG. 1, the NLP-based module 139 utilizes advanced language understanding models, such as transformer-based architectures like BERT (Bidirectional Encoder Representations from Transformers) and GPT (Generative Pre-trained Transformer), to capture the context and semantics of user inputs accurately. In one embodiment, said models are pre-trained on large-scale text corpora and fine-tuned on domain-specific travel data to improve their performance in understanding travel-related queries and preferences.

Illustrated in FIG. 1 is the AI-powered itinerary generation engine 150, which is the core component of the travel planning data processing system 100. According to an embodiment, it employs a combination of machine learning, deep learning, and rule-based algorithms to process user inputs and aggregated data from the travel database 120 to create personalized travel plans.

In another embodiment, the itinerary generation engine 150 includes a feature extraction module 152 configured to identify and extract relevant features from the aggregated travel data, such as price, duration, popularity, and user ratings. Additionally, these features are then fed into a recommendation engine 154 that utilizes collaborative filtering and content-based filtering algorithms to generate personalized recommendations based on user preferences and similar user behavior.

Optionally, a constraint satisfaction module 156 is configured to ensure that the generated itineraries meet the user's specified constraints, such as budget, time, and accessibility requirements. In one embodiment, it employs optimization algorithms, such as genetic algorithms and simulated annealing, to find the best possible itinerary that satisfies the given constraints.

According to an embodiment, a deep learning module 158 utilizes neural network architectures, such as convolutional neural networks (CNNs) and recurrent neural networks (RNNs), to learn complex patterns and relationships within the travel data. Additionally, said models are trained on large datasets of user behavior and preferences to predict user interests and generate highly personalized itinerary recommendations.

With reference to FIG. 1, the multithreading module 160 enables efficient data retrieval and processing by allowing simultaneous data retrieval and processing from various sources in real-time. In one embodiment, it deploys multiple virtual agents 162 configured to perform parallel tasks, such as web scraping, API calls, and data processing, to ensure the timely delivery of comprehensive travel plans.

Optionally, the virtual agents 162 are implemented using a distributed architecture, with each agent running on a separate thread or process. According to an embodiment, the agents communicate and coordinate with each other using message passing techniques, such as message queues and publish-subscribe patterns, to avoid conflicts and ensure data consistency.

In another embodiment, the web scraping agents 164 utilize advanced web crawling and parsing techniques, such as regular expressions and XPath selectors, to extract relevant travel data from various websites and online sources. Additionally, the API integration agents 166 interact with third-party travel APIs, such as Google Maps, Yelp, and TripAdvisor, to retrieve up-to-date information on attractions, restaurants, and transportation options.

Optionally, the data processing agents 168 are configured to perform various data cleaning, transformation, and aggregation tasks to ensure the quality and consistency of the retrieved travel data. In one embodiment, they employ techniques such as data normalization, deduplication, and outlier detection to remove any inconsistencies or errors in the data.

As depicted in FIG. 1, the multithreading module 160 and its subcomponents, comprising the virtual agents 162, web scraping agents 164, API integration agents 166, and data processing agents 168, interact closely with the travel database 120 to ensure efficient and up-to-date data retrieval and storage. In one embodiment, the web scraping agents 164 and API integration agents 166 collect data from various sources and transmit it to the data processing agents 168, which perform cleaning, transformation, and aggregation tasks before storing the processed data in the travel database 120. Additionally, the virtual agents 162 continuously monitor the travel database 120 for any updates or changes, ensuring that the AI-powered itinerary generation engine 150 always has access to the most current and accurate travel information.

With reference to FIG. 1, the AI-powered itinerary generation engine 150 and its subcomponents work in tandem to create personalized travel plans. According to an embodiment, the feature extraction module 152 first retrieves relevant data from the travel database 120 and identifies key features such as price, duration, popularity, and user ratings. Optionally, these extracted features are then passed to the recommendation engine 154, which employs collaborative filtering and content-based filtering algorithms to generate initial itinerary recommendations based on user preferences and similar user behavior. In another embodiment, the constraint satisfaction module 156 takes these recommendations and applies user-specified constraints, such as budget, time, and accessibility requirements, to refine the itineraries further. Additionally the deep learning module 158 continuously learns from user feedback and behavior data to improve the accuracy and relevance of the generated itineraries over time, utilizing neural network architectures such as convolutional neural networks (CNNs) and recurrent neural networks (RNNs) to identify complex patterns and relationships within the travel data.

As shown in FIG. 1, the generated itineraries are presented to users through a user interface 200 hosted on a client device 137. According to an embodiment, the user interface 200 displays the generated itineraries to the user. The itineraries may comprise day-by-day plans, suggested activities, and relevant travel information. Additionally, users can interact with the itinerary, customize it based on their preferences, and access additional features comprising real-time updates, a virtual assistant 270, and social networking. In another embodiment, the user interface 200 utilizes responsive design principles to ensure optimal viewing and interaction across various devices and screen sizes. Optionally, it also incorporates gesture-based navigation and smooth animations to enhance the overall user experience.

In one embodiment, the feedback loop 190 collects user data and preferences during and after the trip, using methods such as user surveys, in-app tracking, and social media monitoring. The collected data includes, but is not limited to, user ratings, comments, and suggestions for the generated itineraries 240, as well as user behavior data, such as places visited, activities undertaken, and time spent at each location. This data is transmitted to the machine learning module 116 via the network 135 for further processing and analysis.

The machine learning module 116 employs various techniques to process and analyze the collected user data and preferences. In one embodiment, natural language processing (NLP) techniques, such as sentiment analysis and topic modeling, are applied to user comments and feedback to extract valuable insights and identify areas for improvement in the itinerary generation process. The sentiment analysis module 143 determines the overall user satisfaction with the generated itineraries 240, while the topic modeling algorithms identify recurring themes and topics in user feedback.

In another embodiment, the machine learning module 116 utilizes collaborative filtering algorithms to identify patterns and similarities in user preferences and behavior. By analyzing the collected user data, the collaborative filtering algorithms can identify user segments with similar travel preferences and tailor the itinerary generation process accordingly. This enables the system 100 to provide highly personalized and relevant travel recommendations to users based on their individual preferences and the preferences of similar users.

The machine learning module 116 also employs reinforcement learning algorithms to continuously optimize the itinerary generation process based on user feedback. In one embodiment, the reinforcement learning algorithms treat the itinerary generation process as a sequential decision-making problem, where the system 100 learns to make optimal decisions based on user feedback and rewards. The system 100 explores different itinerary variations and receives feedback in the form of user ratings and engagement metrics. Overtime, the reinforcement learning algorithms learn to generate itineraries that maximize user satisfaction and engagement.

The insights and optimizations derived from the machine learning module 116 are then fed back into the itinerary generation engine 150 to improve future itinerary recommendations. In one embodiment, the feature extraction module 152 is updated to prioritize features that have been identified as most relevant and important based on user feedback. The recommendation engine 154 is fine-tuned to incorporate the newly discovered user preferences and behavior patterns, enabling it to generate more accurate and personalized itineraries.

The travel planning data processing system 100 is implemented using a distributed microservices architecture, with separate services for user management, data aggregation, AI processing, and itinerary generation. In one embodiment, this architecture ensures scalability, maintainability, and fault-tolerance of the system. Additionally, each microservice is designed to be loosely coupled and independently deployable, allowing for flexible scaling and updates without affecting the entire system. According to an embodiment, said microservices communicate with each other using lightweight protocols, such as REST APIs and gRPC, and are orchestrated using container technologies like Docker and Kubernetes.

To ensure data security and privacy, the system employs state-of-the-art security measures, including encryption for data transmission and storage, secure authentication for user access, and regular security audits to identify and address potential vulnerabilities. In one embodiment, the encryption module (not shown) utilizes industry-standard algorithms, such as AES-256 and RSA, to protect sensitive user data both in transit and at rest. Optionally, the secure authentication module (not shown) implements multi-factor authentication (MFA) and OAuth 2.0 protocols to ensure secure and authorized access to user accounts and system resources. Additionally, the security audit module (not shown) regularly scans the system for potential vulnerabilities, such as SQL injection and cross-site scripting (XSS) attacks, and provides automated patch management and incident response capabilities.

Figure 2:
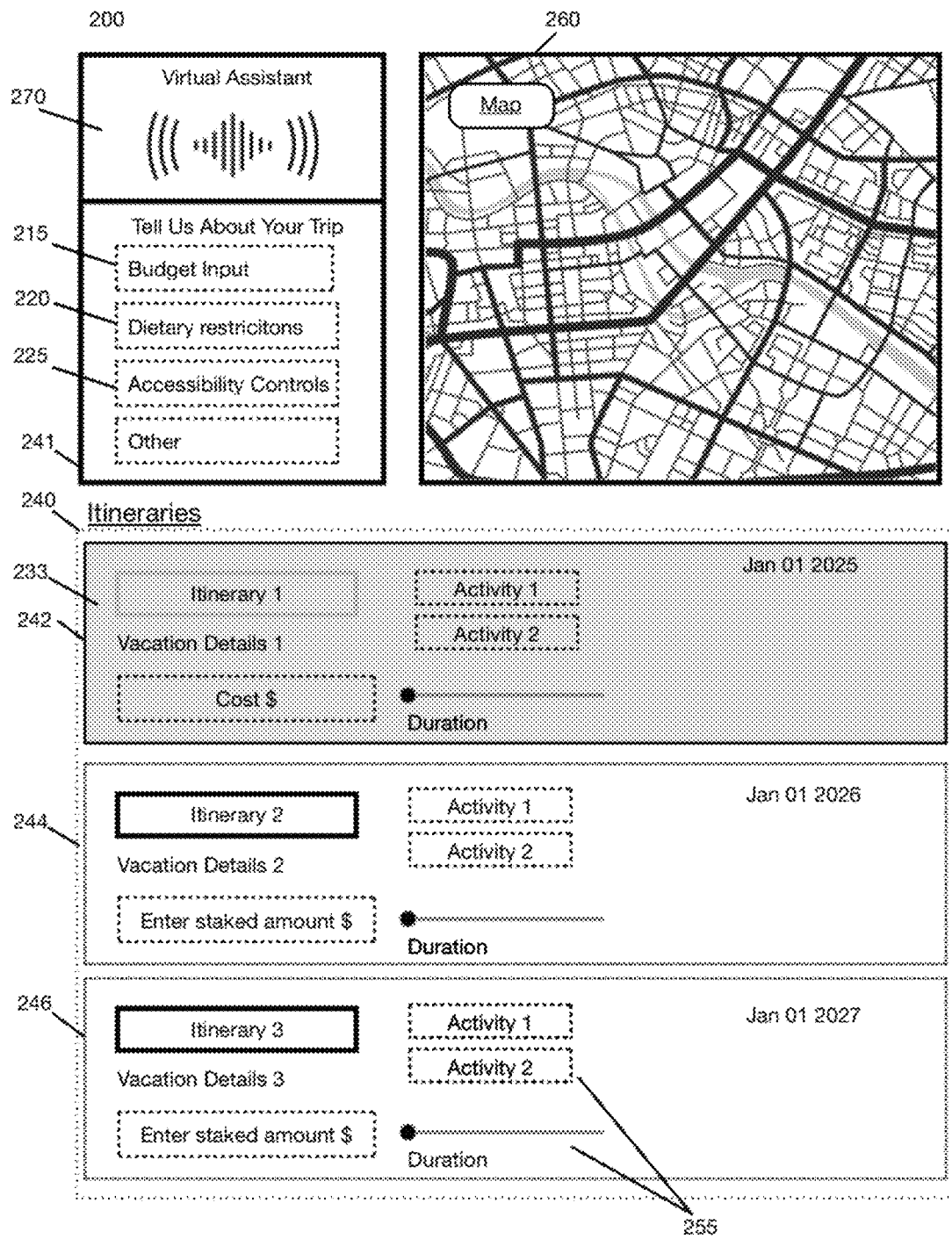
FIG. 2 illustrates an exemplary user interface for interacting with the travel planning data processing system.

FIG. 2 illustrates an exemplary user interface 200 for interacting with the travel planning data processing system. The user interface 200 is displayed on an application hosted on a client device 137, thereby allowing users to input their travel preferences, view generated itineraries, and customize their travel plans.

As shown in FIG. 2, the user interface 200 includes a natural language processing (NLP) based input section 241. Said NLP-based input module 241 enables users to enter their travel dates, destinations, and preferences using natural language. For example, a user can input "I want to visit Paris for a week in June and prefer outdoor activities." The NLP-based input module 139 processes and interprets the user's input, thereby extracting key information such as the destination (Paris), duration (one week), month (June), and preferred activities (outdoor).

The user interface 200 also provides options for users to input additional preferences and constraints. A budget input field 215 allows users to specify their travel budget. Dietary restriction controls 220 enable users to indicate any dietary requirements, such as vegetarian, vegan, or gluten-free. Accessibility requirement controls 225 allow users to specify any accessibility needs, such as wheelchair accessibility or hearing assistance.

In one embodiment, a multithreading module (not shown) in the backend system enables simultaneous data retrieval and processing from various sources in real-time. Thes multithreading module deploys multiple virtual agents to access a travel database (not shown) that stores aggregated data from multiple sources, comprising images, descriptions, weather forecasts, travel tips, historical and geographical information. The virtual agents retrieve and process relevant data based on the user's inputs and preferences.

An AI-powered itinerary generation engine 150, equipped with machine learning capabilities, analyzes the retrieved data to create personalized travel plans. The itinerary generation engine 150 takes into account the user's preferences, budget constraints, dietary restrictions, and accessibility requirements to generate optimized itineraries.

The generated itineraries are presented to the user via an itinerary display area 240 on the user interface 200. As depicted in FIG. 2, the itinerary display area 240 showcases multiple itinerary options 242, 244, 246 based on different user preferences and constraints. Each itinerary option comprises a summary of the suggested activities, day-by-day plans, and relevant travel information.

Users can interact with the generated itineraries using various user interface elements. They can select a preferred itinerary and the itinerary option 242 will be highlighted 233 to indicate it's been selected. Customization controls 255 allow users to modify and fine-tune the selected itinerary. Users can adjust the duration, add or remove activities, and change preferences using said customization controls 255.

An interactive map interface 260 is integrated into the user interface 200. The map interface 260 displays the suggested activities and locations from the selected itinerary. Users can interact with the map interface 260 to view details about each activity or location. In some embodiments the user can also modify the itinerary directly on the map by dragging and dropping activities to different time slots or locations.

The user interface 200 further includes a virtual assistant 270 configured to provide personalized recommendations and answers to user queries. The virtual assistant 270 utilizes natural language processing techniques to understand user inquiries and provide relevant information. Users can ask questions related to their travel plans, such as "What are the must-visit attractions in Paris?" or "Can you suggest a good vegetarian restaurant near my hotel?" The virtual assistant 270 generates responses based on the information stored in the travel database and the user's preferences.

Figure 3:
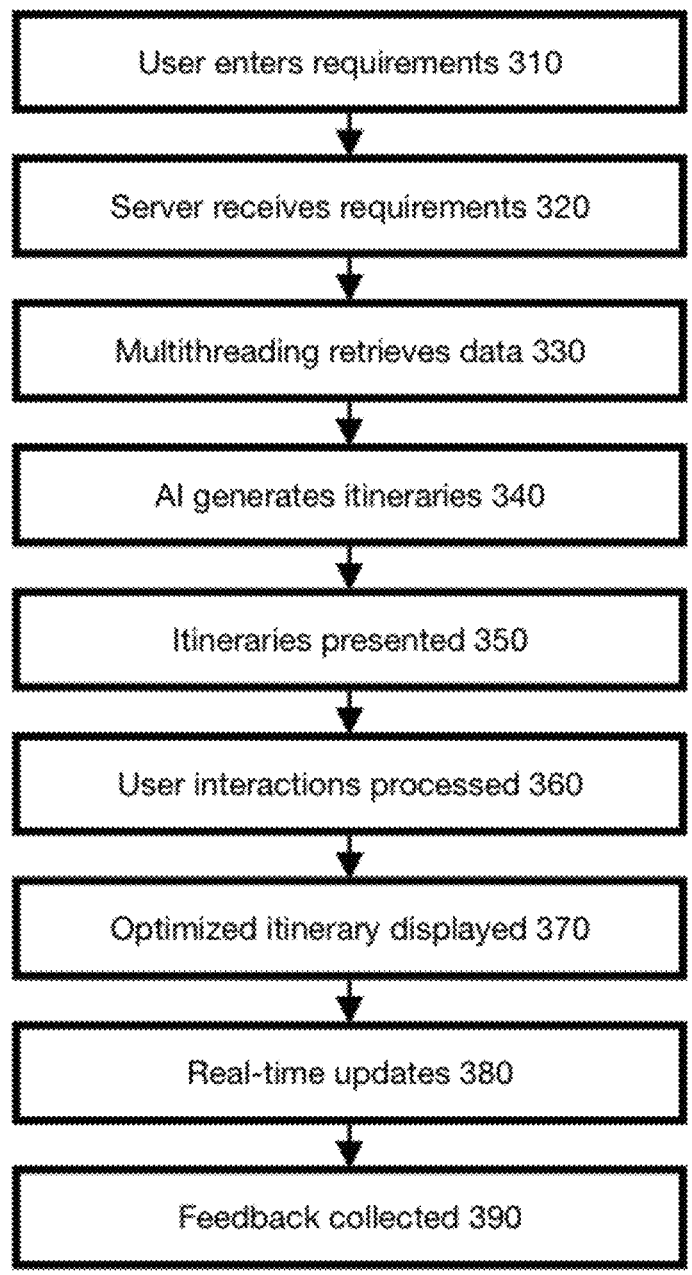
FIG. 3 is a flow diagram illustrating the user interaction and system information flow for the travel planning data processing system.

FIG. 3 is a flow diagram illustrating the user interaction and system information flow for the travel planning data processing system 100. The process begins with the user accessing the user interface 200, which displays the NLP-based user interface 241. As shown in FIG. 3, the user enters their travel requirements 310, comprising travel dates, destinations, and preferences, using natural language queries. The NLP-based user interface 241 processes the user's input using advanced language understanding models to interpret and extract relevant information accurately.

The extracted user requirements are then sent to the central server 110 for processing. With reference to FIG. 3, the central server 110, equipped with one or more processors 112, memory 114, and a machine learning module 116, receives the user requirements 320. Said one or more processors 112 initiate the data retrieval and processing workflow by activating the multithreading module 160.

Depicted in FIG. 3, the multithreading module 160 deploys multiple virtual agents 162 to perform parallel data retrieval and processing tasks 330. The virtual agents 162 access the travel database 120, which stores aggregated data from various sources, comprising images 122, descriptions 124, weather forecasts 126, travel tips 128, historical information 130, and geographical information 132. The virtual agents 162 retrieve relevant data based on the user's requirements and preferences.

The retrieved data is then processed by the AI-powered itinerary generation engine 150. In one embodiment, the itinerary generation engine 150 employs various AI techniques, such as machine learning, deep learning, and rule-based algorithms, to analyze the user's preferences, travel data patterns, and constraints 340. It considers factors comprising the user's budget 215, dietary restrictions 220, and accessibility requirements 225 to generate optimized itineraries.

The generated itineraries are then sent back to the user interface 200 for presentation to the user 350. As such, the user interface 200 displays the itinerary options 242, 244, 246 in the itinerary display area 240. The user can interact with the generated itineraries using selection controls 250 and customization controls 255, wherein they can select a preferred itinerary option and modify it based on their preferences.

The user's interactions with the itinerary, such as selecting an itinerary option or making customizations, are captured by the user interface 200 and sent back to the central server 110 for further processing 360. In another embodiment, the machine learning module 116 analyzes the user's interactions and preferences to continuously optimize the itinerary generation process. It employs techniques such as supervised learning, unsupervised learning, and reinforcement learning to improve the accuracy and relevance of the generated itineraries over time, thereby enhancing the user experience.

The optimized itinerary is then sent back to the user interface 200 for display to the user 370 within one minute. The user can interact with the optimized itinerary using the interactive map interface 260, which displays suggested activities and locations. Optionally, the user can also access the virtual assistant 270 for personalized recommendations and queries related to their travel plans.

Throughout the user's interaction with the system, the real-time update module 180 continuously updates the travel database 120 with real-time information, such as flight delays, weather changes, and event cancellations 380. This ensures that the generated itineraries remain up-to-date and accurate, taking into account any last-minute changes or disruptions.

After the user's trip, the feedback loop 190 collects user data and preferences 390 through methods such as user surveys, in-app tracking, and social media monitoring. The collected data is fed back into the machine learning module 116 to further improve the accuracy and relevance of future itinerary generation processes.

Throughout the entire process, the system employs state-of-the-art security measures, comprising encryption 182 for data transmission and storage, secure authentication 184 for user access, and regular security audits 186 to ensure data security and privacy.

According to an embodiment, the travel planning data processing system 100 is implemented using a distributed microservices architecture with separate services for user management, data aggregation, AI processing, and itinerary generation, coupled to ensure scalability, maintainability, and fault-tolerance of the system.

The following are selected elements of the present invention.

Section 1: Enhancements to the Travel Planning Algorithm

The travel planning algorithm has undergone a comprehensive overhaul to accommodate advanced AI-based solutions. This improvement focuses on multi-sequence processing, which allows for a more granular analysis of user inputs. Each sequence is dedicated to analyzing a specific aspect of the data, ensuring that the resulting itinerary is both accurate and personalized.

1.1 Multi-Sequence Processing Architecture

The algorithm's multi-sequence structure can be broken down as follows:

1. Data Collection Sequence
   In this stage, the application collects user inputs, including travel dates, preferences, and desired activities.
   The system leverages an intuitive user interface, powered by Natural Language Processing (NLP), to ensure a smooth data entry process.
2. Data Parsing and Preprocessing
   The raw data is parsed to extract meaningful elements. For instance:
   Location Extraction: Identifying the destination from user inputs.
   Preference Analysis: Classifying preferences such as cultural tours or adventure activities.
3. Customizable Loop for Refinement
   After initial data processing, the system enters a feedback loop that continuously refines the itinerary.
   The loop adjusts the plan based on any updates or changes provided by the user.

1.2 AI-Driven Customization

Customization is the cornerstone of the system. The AI leverages machine learning models to tailor each itinerary based on:
   Travel Style: Whether the user prefers a relaxed, leisure-focused trip or an active, adventure packed itinerary.
   Activity Preferences: Recommendations for activities, including sightseeing, dining, and leisure, based on historical data and user feedback.
   Time Segmentation: Dividing the day into distinct segments (morning, afternoon, evening) to create a balanced schedule.

1.3 Integration with External Data Sources

The algorithm enriches itineraries by pulling data from various external sources: —OpenAI and ChatGPT: For generating personalized descriptions and recommendations. —Google APIs: To provide maps, location details, and points of interest. —Open Data Channels: Leveraging publicly available data for local events and tips.

Section 2: User Input Handling and Data Integration

The ability to efficiently collect and process user inputs is a fundamental feature of the AI-driven travel planning system. The updated process not only collects a broad range of preferences from the user but also integrates these inputs into the system to generate a highly customized itinerary.

In this section, we will explore the user input handling process, its integration with various data sources, and the way the system synthesizes the data to enhance the travel planning experience.

2.1 Gathering User Inputs

The first step in the travel planning process is gathering the necessary information from the user.

This is done through a natural language processing (NLP)-based user interface, which allows for a conversational approach to data input. Users can simply type their preferences or speak their requests, and the system interprets the input to extract the relevant details.

Key Input Types: —Travel Dates: Users provide their desired travel dates, which are crucial for scheduling activities and optimizing travel times. —Destinations: The system identifies the travel destination(s) based on the input, which helps in customizing the itinerary according to regional characteristics. —Activity Preferences: The user can indicate their preferences for specific types of activities, such as adventure, cultural experiences, or relaxation. This ensures that the recommended activities match their interests. —Budget Constraints: Users can specify a budget range, which will be used to select accommodations, dining, and activities that fit their financial constraints. —Dietary and Accessibility Needs: Information about dietary restrictions (e.g., vegetarian, vegan, gluten-free) or accessibility requirements (e.g., wheelchair access) is captured to make suitable recommendations.

Input Processing and Analysis

Once the input is collected, the system parses the data to ensure it is understood correctly. Key tasks include: —Entity Extraction: Identifying important entities such as location names, dates, activity types, and budget values. —Preference Classification: Organizing preferences into categories (e.g., leisure, adventure, cultural, etc.) to guide the itinerary creation process.

2.2 Data Aggregation from External Sources

To create a truly personalized travel plan, the system aggregates data from various external sources. This allows for the inclusion of up-to-date information about the destination, available activities, accommodation options, and more.

Primary Data Sources:

1. Google APIs

The system utilizes Google Maps and other APIs to gather data about the destination, including popular tourist spots, restaurants, transportation options, and local events.

Location Data: Real-time location data helps refine the itinerary based on proximity and accessibility.

2. OpenAI and ChatGPT

OpenAI-powered models provide personalized recommendations based on natural language understanding. This ensures that the itinerary is conversational and tailored to individual preferences.

Recommendation Engine: Based on input data, the AI generates travel recommendations, including local attractions and hidden gems that may not be widely known.

3. Travel Databases

Aggregated data from various travel databases provides additional context, such as weather forecasts, hotel availability, and popular activity ratings.

Travel Insights: From past user reviews to global travel trends, the system compiles insights to recommend the most relevant experiences.

4. Social Media and Open-Source Channels

Social media platforms, blogs, and forums provide valuable real-time insights into trending destinations, local tips, and unadvertised attractions.

User-Generated Content: By tapping into open-source platforms, the system integrates grassroots recommendations into the itinerary.

Data Integration and Synchronization

All the gathered data is synchronized and integrated into a centralized system. This ensures that the travel plan reflects the latest, most relevant information from multiple sources. By continuously updating the data, the system guarantees that itineraries are always based on real-time, accurate insights.

2.3 Synthesis and Itinerary Customization

After the data is collected and aggregated, the system synthesizes the inputs to create a personalized itinerary. This involves combining user preferences with the data gathered from external sources to design a travel plan that meets the user's needs.

AI-Powered Personalization

Using advanced machine learning models, the system analyzes the preferences and data to generate a complete itinerary, including: —Day-by-Day Itinerary: A detailed, segmented itinerary that breaks the trip into morning, afternoon, and evening activities. —Customized Recommendations: Activities that match the user's interests, along with suggestions for dining, shopping, and sightseeing. —Travel Logistics: The system also suggests travel routes, accommodations, and transportation based on the user's budget, preferences, and destination.

Optimizing User Preferences

The system takes all user preferences into account, including constraints such as time, budget, and dietary needs. By utilizing AI models like collaborative filtering and content-based filtering, the system fine-tunes recommendations based on the user's past preferences and behavior patterns.

Budget Constraints: If the user specifies a budget range, the system will adjust the itinerary to include only options that fit within this limit. This may involve suggesting more affordable accommodations or local dining options.

Dietary Needs: The system filters activity and restaurant recommendations to accommodate specific dietary restrictions, such as vegan or gluten-free preferences.

Time Management: The itinerary is optimized for time, ensuring that users can visit all desired attractions while minimizing unnecessary travel time.

Conclusion of Section 2: User Input Handling and Data Integration

The updated system's ability to efficiently gather and integrate user inputs into a personalized travel plan is a key feature of the platform. By combining AI-powered analysis with real-time data aggregation from multiple sources, the system creates itineraries that are not only customized but also up-to-date and highly relevant. The dynamic handling of user inputs, preferences, and constraints ensures that each trip is tailored to meet the unique needs of every traveler, resulting in a seamless and enjoyable travel experience.

The machine learning categorization engine processes the data using pre-trained models. It comprises an application-specific integrated circuit (ASIC) for an artificial neural network connected to the computer memory device, the ASIC comprising: a plurality of neurons organized in an array, wherein each neuron comprises a register, a processing element and at least one input, and a plurality of synaptic circuits, each synaptic circuit including a memory for storing a synaptic weight, wherein each neuron is connected to at least one other neuron via one of the plurality of synaptic circuits, wherein the array is configured to analyze said user data using machine learning algorithms trained on historical datasets regarding where users traveled based on the user preference inputs, wherein the AI/ML categorization engine identifies transaction attributes, assigns significance scores, and classifies said data into categories.

Section 3: Resource Optimization

Resource optimization is a critical component of the AI-driven travel planning system. Given the complex nature of the data processing, travel recommendations, and real-time data aggregation, ensuring that the application uses resources efficiently is essential for providing a seamless user experience. This section will discuss the strategies implemented to minimize resource usage while maintaining high performance and responsiveness, focusing on on-demand data fetching, image optimization, API efficiency, and server load management.

3.1 On-Demand Data Fetching

One of the primary methods of optimizing resources is the use of on-demand data fetching.

Instead of loading all available information at once, the system only fetches the data that is needed for a specific user request. This approach greatly reduces unnecessary data retrieval, which helps conserve server resources and decreases response time.

How On-Demand Fetching Works:
  User Request Trigger: When a user provides input (such as selecting a destination or choosing a type of activity), the system fetches only the relevant data for that particular request. —Data Retrieval: The system accesses external databases and APIs only when necessary to gather real-time information, such as hotel availability, transportation options, or current weather conditions.
  Efficient Data Loading: As the user interacts with the app, only relevant portions of the travel itinerary are dynamically loaded. For example, when a user moves to a new day in their itinerary or adds a new activity, the system retrieves new information at that moment.
  Benefits of On-Demand Fetching: —Reduced Server Load: By only requesting data when it is needed, server strain is minimized, leading to faster performance and lower operational costs. —Faster Response Times: Users experience quicker loading times, as they only have to wait for specific data to be retrieved, rather than the entire itinerary. —Data Relevance: Only the most current and applicable data is presented, ensuring that users receive real-time and accurate information.

3.2 Image Optimization and Efficient Handling

Images are essential for providing a visually engaging user experience, especially in a travel planning application where visuals of destinations, activities, and accommodations play a critical role in decision-making. However, images can also consume significant resources if not managed efficiently. The system has implemented several strategies to optimize image handling and ensure that they are displayed correctly without consuming excessive bandwidth or storage space.

Key Strategies for Image Optimization:
1. Dual Format Storage
  Images are stored in two formats to ensure compatibility with both landscape and portrait orientations. This allows the system to display images optimally on mobile devices and desktops, without having to store multiple copies of each image.
  This reduces storage overhead while maintaining flexibility in displaying images across devices.
2. Compression and Resolution Scaling
  Images are compressed without sacrificing quality. This reduces file sizes, enabling faster loading times and less bandwidth usage.
  The system automatically adjusts the resolution of images based on the device type. For instance, smaller images may be served to mobile devices, while larger, higher-resolution images are delivered to desktop users for a richer experience.
3. Lazy Loading
  The system employs lazy loading for images, which means that images are only loaded when they come into view on the user's screen. For instance, images of activities or destinations will only be loaded when the user scrolls down to that specific section of the itinerary.
  This ensures that the application does not attempt to load all images at once, saving bandwidth and improving responsiveness.

Benefits of Image Optimization:
  Faster Load Times: Image optimization leads to quicker page loads, improving the user experience, especially on mobile devices with slower internet connections.
  Lower Data Consumption: By serving appropriately sized images and reducing file sizes, the application consumes less data, which is particularly beneficial for users with limited bandwidth. —Better Device Compatibility: Whether the user is accessing the application from a smartphone or desktop, the images will automatically adjust to the appropriate size and resolution.

3.3 API Efficiency and Reduced Calls

APIs are a vital component of the travel planning system, as they provide the necessary data for destinations, activities, accommodations, and more. However, making frequent API calls can quickly become resource-intensive and result in slower response times. To mitigate this, the system implements several strategies to optimize API efficiency.

Strategies for Efficient API Usage:
1. Caching Frequently Accessed Data
  To reduce the need for repeated API calls, frequently accessed data (such as commonly visited destinations, popular activities, and commonly used transportation methods) is cached.
  Cached data is stored temporarily on the server or client side, ensuring that the system can quickly retrieve this information without making another call to the external API.
2. Batching API Requests
  Instead of making individual API calls for each piece of information (e.g., one for weather, one for hotels, one for attractions), the system batches requests together. This reduces the number of calls made to the server and decreases the overall load.

For instance, a single batch request might ask for all accommodation options, nearby restaurants, and weather conditions for a specific destination.

3. API Rate Limiting and Throttling

The system incorporates rate limiting and throttling mechanisms to control the number of API calls made in a given time period. This ensures that the system does not overwhelm external services and complies with usage restrictions set by the API providers.

When the system detects high traffic or frequent requests, it reduces the number of calls temporarily, ensuring consistent performance.

Benefits of API Efficiency: —Reduced Latency: Batching requests and caching data minimizes delays, providing users with faster results when accessing key travel information. —Lower Operational Costs: By optimizing API calls and reducing unnecessary requests, the system lowers the costs associated with third-party API services, which are often billed based on usage. —Better User Experience: Users experience less lag and more consistent response times, ensuring a smooth, engaging interaction with the app.

3.4 Server Load Management

Managing server load is essential for ensuring that the system operates smoothly, especially during peak usage times. A sudden surge in traffic can overload the servers, leading to delays and poor performance. To prevent this, the system uses a variety of load management strategies.

Key Strategies for Server Load Optimization:

1. Horizontal Scaling

The system supports horizontal scaling, which involves adding more servers to handle increased traffic. When traffic spikes, new servers can be quickly brought online to distribute the load, ensuring continued responsiveness.

This approach ensures that the system can handle high demand without compromising performance.

2. Load Balancing

The application uses load balancers to evenly distribute user requests across multiple servers.

This prevents any single server from being overwhelmed with too many requests and ensures that the system can handle high user volumes effectively.

Load balancing algorithms consider factors such as server health, current load, and geographical location to determine where each request should be routed.

3. Cloud Services

Leveraging cloud infrastructure allows the system to scale resources up or down based on demand. During periods of high traffic, additional computing resources are provisioned automatically, ensuring that the system remains responsive.

Cloud providers offer tools that monitor traffic and automatically adjust resources to match the demand.

Benefits of Server Load Management: —Improved Scalability: Horizontal scaling and load balancing ensure that the system can handle varying amounts of traffic without degradation in performance. —High Availability: The system remains available even during high traffic periods, thanks to cloud infrastructure and load balancing techniques. —Cost-Effective: By using cloud services and scaling resources dynamically, the system can minimize costs during periods of low traffic while being fully equipped to handle peak demand.

Conclusion of Section 3: Resource Optimization

Resource optimization is crucial to the performance and efficiency of the AI-driven travel planning system. Through on-demand data fetching, image optimization, API efficiency, and server load management, the system ensures that resources are utilized in the most effective way possible.

These strategies not only improve response times and reduce operational costs but also enhance the user experience by providing fast, real-time, and relevant travel information. By optimizing resources, the system ensures that users can plan their trips with minimal delays and maximum efficiency.

Section 4: User Engagement and Real-Time Updates

User engagement is a key aspect of any travel planning system. The more engaged users are with the platform, the more likely they are to have a positive experience and return for future use. This section will explore the strategies implemented to enhance user interaction within the application, including real-time updates, interactive features, and personalization elements. These strategies ensure that users remain involved throughout the planning process and that their travel plans evolve in real-time based on new information and personal preferences.

4.1 Real-Time Updates

The ability to deliver real-time updates is essential for keeping users informed about the latest developments during their trip planning process. Whether it's changes to flight schedules, weather conditions, or local events, real-time data ensures that users are always up-to-date and can adjust their plans accordingly.

How Real-Time Updates Work: —Dynamic Itinerary Adjustments: As new information becomes available, the system automatically adjusts the itinerary to reflect the most current details. For example, if there's a change in the weather forecast, the system might suggest an indoor activity instead of an outdoor one.

Live Notifications: Users receive notifications about critical updates, such as flight delays, cancellations, or last-minute events in their travel destination. These notifications are sent via the app and can be customized to the user's preferences.

Real-Time Integration with External Data Sources: The system pulls data in real-time from various external sources, such as airlines, weather APIs, and local events platforms. This ensures that users are always receiving the latest, most accurate information about their trips.

Benefits of Real-Time Updates: —Enhanced User Experience: Users feel more confident in their trip planning when they know that their itinerary is being constantly updated with the latest information. —Better Decision Making: Real-time data helps users make informed decisions on-the-go, whether it's choosing the best time to visit a tourist spot or selecting an alternate activity due to a weather change. —Increased Engagement: Users are more likely to stay engaged with the platform when they know that the system is actively updating their plans based on real-time information.

4.2 Interactive Features

Keeping users engaged during the travel planning process requires an interface that is both intuitive and interactive. The system incorporates several interactive features that allow users to modify, explore, and visualize their itinerary in a fun and engaging way.

Key Interactive Features:
1. Customizable Itinerary
    Users can easily modify their itinerary by adding, removing, or rescheduling activities.
    A simple drag-and-drop interface allows users to change the order of events, ensuring the
    itinerary fits their preferences perfectly.
2. Interactive Map
    An interactive map is integrated into the user interface, allowing users to visualize their travel route and activities.
    Locations of activities, accommodations, and restaurants are displayed on the map, enabling users to see how far apart they are and plan accordingly.

There is a computer-implemented method of providing an automated tour guide for a user in a travel social network, comprising:
    obtaining travel preference data from a user computer device;
    storing the travel preference data;
    receiving, at the user computer terminal, a natural language request to plan one or more travel events;
    routing the natural language request to an external application via an application programming interface;
    processing, by a computer processor on a remote server serving the external application accessed through the application programming interface, the natural language request and the preference information to provide a recommended travel itinerary.
    receiving location information from the user computer device, wherein whenever the user computing device moves location as measured by its GPS input obtained according to a predetermined update time interval a change in location is measured (e.g., the GPS input is obtained every 10 seconds, every 30 seconds, or every minute)
    retrieving the stored travel preference data for the user and comparing the stored travel preference data to information about nearby locations to calculate nearby points of interest;
    displaying updated points of interest when a change in location is measured by a new GPS input;
    capturing a first image with a camera lens and processing it within the camera to create first image data;
    overlaying information about one or more calculated nearby points of interest onto the display screen of the user computing device created from the first image data, wherein the nearby points of interest are selected based on the received location information and the stored travel preference data;
    displaying first distance measurements from the user's first location to the nearby points of interest on a display of the user;
    presenting, on the user computing device, information regarding a second user computer terminal in geographic proximity to the user's first location;
    receiving, on the user computing device, a message from the second user computer terminal;
    displaying the location of the second user computer terminal on the user computing device alongside the message from the second user computer terminal;
    measuring a change in position from the previous location of the user computing device;
    measuring a change in location from the previous location of the second user computer terminal, wherein whenever the user computing device moves location according to new GPS input a change in location is measured;
    capturing a second image with the camera lens and processing it within the camera to create second image data;
    displaying second distance measurements from the user's second location to the nearby points of interest on the display screen of the user computing device created from the second image data based on the change in location information; and
    displaying second distance measurements from the user's second location to the second user terminal on a display of the second user terminal based on the change in location information.
3. Virtual Assistant for Travel Recommendations
    A virtual assistant is available within the app to offer personalized recommendations, answer questions, and provide additional details about activities or destinations.
    Users can interact with the assistant by typing or speaking questions, such as "What are the top attractions in Paris?" or "Can you recommend a nearby restaurant?"
4. Activity Filtering
    Users can filter available activities based on various criteria, including type (e.g., outdoor, cultural), duration, budget, and user ratings.
    This helps users quickly identify the activities that best match their preferences.
    Benefits of Interactive Features: —Personalized User Experience: Customization options, such as modifying the itinerary and filtering activities, ensure that users can tailor their travel plans to their specific needs. —Increased Engagement: Interactive elements such as maps and virtual assistants keep users engaged by allowing them to actively participate in the planning process. —Convenience: The ability to modify plans and filter options directly within the app gives users greater control over their travel experiences.
4.3 Personalization and Customization
    Personalization is at the heart of the travel planning experience. The system uses AI and machine learning algorithms to ensure that each itinerary is uniquely tailored to the user's preferences, previous behavior, and feedback.
Personalization Mechanisms:
1. Preference Tracking
    The system tracks user preferences over time, learning what types of activities or experiences the user enjoys most.
    As users plan more trips or interact with the system, the AI gets better at recommending activities that align with their interests.
2. Recommendation Engine
    Based on user input and past behavior, the system generates personalized recommendations for destinations, accommodations, and activities.
    The system continuously refines its recommendations using machine learning algorithms, ensuring that future suggestions are more relevant.
3. Dynamic Itinerary Adjustments
    The system adjusts the itinerary in response to user feedback. For example, if a user expresses dissatisfaction with an activity suggestion, the system will suggest a different option based on their preferences.
4. Contextual Customization
    The system customizes the itinerary based on contextual factors, such as the time of day, weather conditions, and even the user's mood. For instance, if the user prefers a relaxing evening after an active day, the system may suggest a spa visit or a quiet dinner.
Benefits of Personalization: —Enhanced User Satisfaction: Personalization ensures that the itinerary aligns with the user's preferences, increasing overall satisfaction with the travel planning process. —Relevance of Recommendations: Personalized recommendations are more likely to resonate with the user, leading to a higher rate of activity selection and engagement. —Long-Term Engagement: Users are more likely to return to the platform if they know it will provide tailored suggestions based on their preferences and past behavior.

Conclusion of Section 4: User Engagement and Real-Time Updates

By incorporating real-time updates, interactive features, and personalization mechanisms, the travel planning system ensures that users are not only engaged but also provided with an itinerary that meets their unique needs and preferences. Real-time data integration allows the system to adapt on the fly, making adjustments as new information becomes available. With gamification elements and a highly interactive interface, users are encouraged to explore, customize, and share their travel plans, leading to a more enjoyable and efficient planning experience.

Section 5: Conclusion

The enhanced AI-driven travel planning system represents a significant leap forward in the way travelers plan their trips. By integrating advanced algorithms, real-time data updates, seamless user engagement features, and deep customization, the system ensures that every user receives a personalized, efficient, and enjoyable travel planning experience. This final section provides a summary of the system's key features and highlights its advantages, as well as the future potential for even further improvements.

5.1 Key Features Recap

The core strengths of the travel planning system can be summarized into several distinct features:

1. Multi-Sequence Algorithm

The system's multi-sequence architecture allows for the processing of user inputs in stages, ensuring that each piece of data is meticulously analyzed and incorporated into the final itinerary.

This robust algorithmic structure results in highly accurate and personalized travel recommendations, making the system adaptive to user preferences and needs.

2. On-Demand Data Fetching and Image Optimization

By utilizing on-demand data fetching, the system minimizes unnecessary resource consumption and enhances performance.

Image optimization ensures that resources are used efficiently, with high-quality images being served in formats compatible across devices and orientations.

3. Real-Time Updates

Real-time data integration ensures that users are always informed of the latest changes in travel conditions, whether it's flight delays, weather changes, or local events.

This feature allows users to make informed decisions, keeping their itinerary up-to-date and responsive to any emerging factors.

4. Interactive and Customizable Features

Users have the ability to customize their itineraries through a simple drag-and-drop interface and can filter activities based on their preferences.

The inclusion of an interactive map enhances usability, while the virtual assistant provides instant recommendations and support.

5. Advanced Personalization

The system continuously learns from user behavior and feedback, adapting its recommendations based on past preferences and travel patterns.

By leveraging machine learning models, the system ensures that future itineraries are even more tailored to the user's unique needs.

6. Gamification and Rewards

To further engage users, the system includes gamification elements that reward users for planning trips, completing activities, and sharing itineraries.

These features help keep the user experience fun and interactive while encouraging users to explore more destinations and activities.

5.2 Advantages of the System

The key advantages of the AI-powered travel planning system are:

1. Personalized Travel Planning

Every user's itinerary is customized based on their individual preferences, travel styles, and constraints, making the travel planning process highly personal and relevant.

2. Efficiency and Speed

The system's advanced algorithms and on-demand data fetching ensure that itineraries are created quickly and efficiently, reducing the time spent planning a trip while maximizing its quality.

3. Scalability and Adaptability

The platform is scalable, able to handle increasing user demand without compromising performance. The system is also adaptable, continually learning from user interactions and improving over time.

4. Seamless User Experience

With an intuitive, easy-to-navigate interface, the system provides a seamless experience for users. The integration of interactive features such as maps and real-time updates makes the process engaging and informative.

5. Cost-Effective

By optimizing resources, such as using on-demand data and caching frequently accessed information, the system reduces operational costs, which can be passed on as savings to the user or invested in further system improvements.

The embodiments described herein are given for the purpose of facilitating the understanding of the present invention and are not intended to limit the interpretation of the present invention. The respective elements and their arrangements, materials, conditions, shapes, sizes, or the like of the embodiment are not limited to the illustrated examples but may be appropriately changed. Further, the constituents described in the embodiment may be partially replaced or combined together.

What is claimed is:

1. A computer-implemented method of providing an automated travel experience for users in a travel social network, comprising:

obtaining travel preference data from a first user computer terminal;

storing the travel preference data;

receiving, at the first user computer terminal, a natural language request to plan one or more travel events;

routing the natural language request across multiple servers to evenly distribute user requests based on a load balancer configured to assess server health, current load and geographical location;

processing the natural language request by a an application-specific integrated circuit (ASIC) for an artificial neural network connected to a computer memory device, the ASIC comprising: a plurality of neurons organized in an array, wherein each neuron comprises a register, a processing element and at least one input, and a plurality of synaptic circuits, each synaptic circuit including a memory for storing a synaptic weight, wherein each neuron is connected to at least one other neuron via one of the plurality of synaptic circuits, wherein the array is configured to analyze said user data using machine learning algorithms trained on historical datasets containing data on where users traveled based on the user preference inputs, wherein the array identifies transaction attributes, assigns, significance scores, and classifies said data into categories and provide a recommended travel itinerary as the output of the ASIC;

receiving location information from the first user computer terminal, wherein whenever the first user computer terminal moves location as measured by its GPS input a change in location is measured, indicating that the user is in the location of the recommended travel itinerary;

retrieving the stored travel preference data for the user and comparing the stored travel preference data to information about nearby locations to calculate nearby points of interest;

displaying updated points of interest when a change in location is measured by a new GPS input;

capturing a first image with a camera lens and processing it within the camera to create first image data;

overlaying information about one or more calculated nearby points of interest onto a display screen of the first user computer terminal created from the first image data, wherein the nearby points of interest are selected based on the received location information and the stored travel preference data, wherein the obtaining the points of interest comprises:

batching requests for nearby points of interest from one or more additional users;

limiting the number of API calls made in a given time period in compliance with usage restrictions set by individual API providers;

caching data on the first user computer terminal for frequently accessed locations;

displaying first distance measurements from the user's first location to the nearby points of interest on the display of the first user computer terminal;

presenting, on the first user computer terminal, information regarding a second user computer terminal in geographic proximity to the user's first location;

receiving, on the first user computer terminal, a message from the second user computer terminal;

displaying the location of the second user computer terminal on the first user computer terminal alongside the message from the second user computer terminal;

measuring a change in location from the first location of the first user computer terminal;

measuring a change in location from the previous location of the second user computer terminal, wherein whenever the second user computer terminal moves location according to new GPS input obtained according to a predetermined update time interval a change in location is measured;

capturing a second image with the camera lens and processing it within the camera to create second image data;

displaying second distance measurements from the user's second location to the nearby points of interest on the display screen of the first user computer terminal created from the second image data based on the change in location of the first user computer terminal; and displaying second distance measurements from the user's second location to the second user computer terminal on a display of the second user computer terminal based on the change in location of the first user computer terminal.

* * * * *